No. 786,880. PATENTED APR. 11, 1905.
C. F. DIETZ.
DOUGH FORMING MACHINE.
APPLICATION FILED FEB. 19, 1904.
3 SHEETS—SHEET 2.
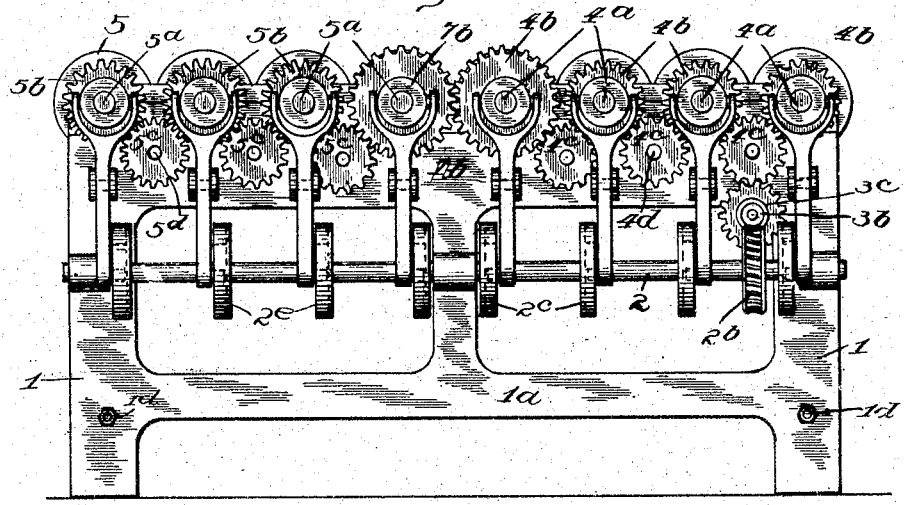
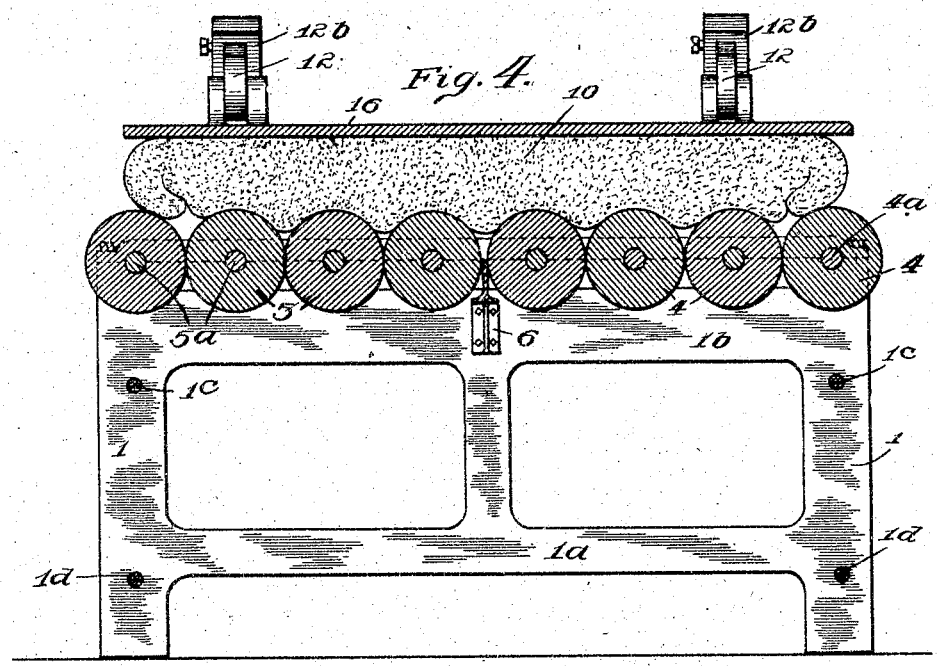
Witnesses:
John Braunwalder
L. G. Snow
Inventor:
Christian F. Dietz
by
Frederick Benjamin
Att'y

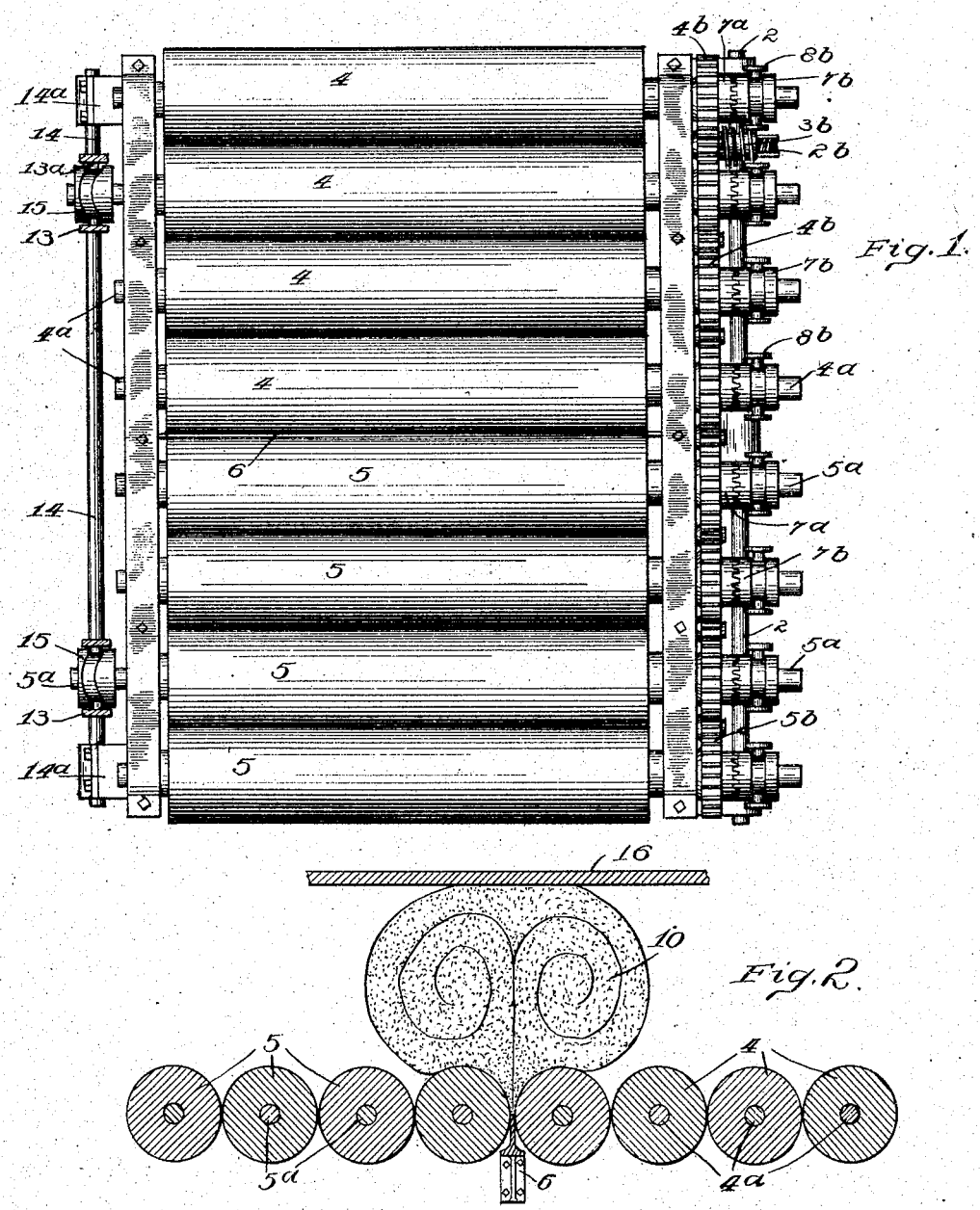

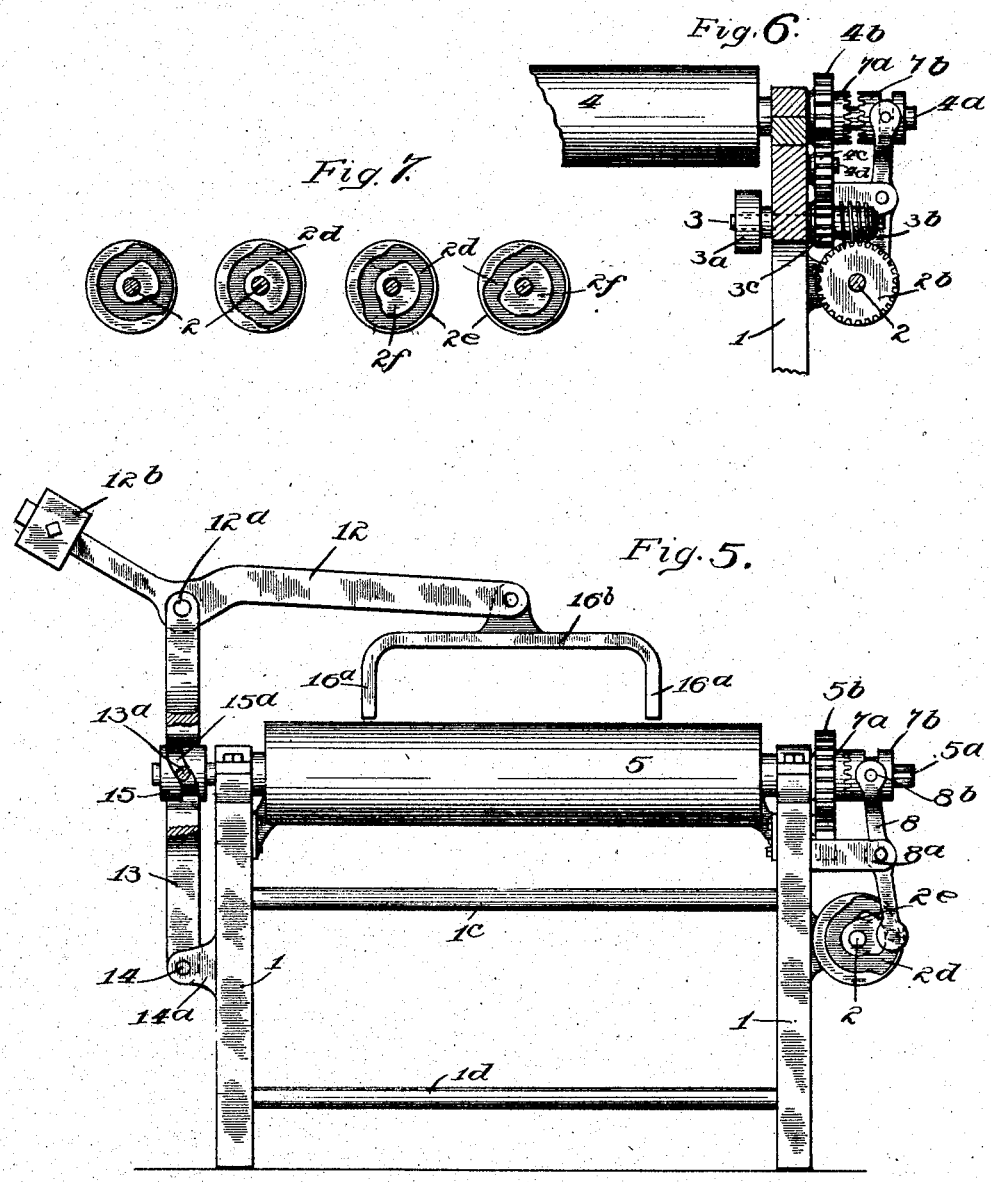

No. 786,880. Patented April 11, 1905.

UNITED STATES PATENT OFFICE.

CHRISTIAN F. DIETZ, OF CHICAGO, ILLINOIS, ASSIGNOR OF ONE-THIRD TO PHILIP F. CARROLL, OF JOLIET, ILLINOIS, AND ONE-THIRD TO BERTHA JUNGE, OF CHICAGO, ILLINOIS, AND AUGUST JUNGE, JR., OF JOPLIN, MISSOURI, EXECUTORS OF AUGUST JUNGE, DECEASED.

DOUGH-FORMING MACHINE.

SPECIFICATION forming part of Letters Patent No. 786,880, dated April 11, 1905.

Application filed February 19, 1904. Serial No. 194,423.

*To all whom it may concern:*

Be it known that I, CHRISTIAN F. DIETZ, a citizen of the United States, residing at Chicago, in the county of Cook and State of Illinois, have invented certain new and useful Improvements in Dough-Forming Machines, of which the following is a specification.

This invention relates to improvements in that type of machines for manipulating bread-dough in the formation of loaves in which the surface or skin of the lump of dough is drawn or stretched about a core or common center or axis, with the result that the mass of irregular shape and broken surface is converted into a symmetrical form having a smooth surface.

The especial object of the improvements hereinafter described in detail is to produce a machine in which the dough in the condition in which it comes from the dividing-machine is first flattened out and then rolled up in concentric folds from opposite ends, in which the skin of the dough will be stretched while the mass is being rolled, in which the finished product will be either of cylindrical or spherical form and practically without a seam or line to mark the division-line in it, and in which the loaf will be compact and maintain its shape under all the conditions to which it may be subjected before being placed in the oven for baking. In this machine an important result attained is that while the lump of dough is brought into a compact form there is but little pressure exerted on it, but a pulling and stretching which facilitates the action of the gases resulting from the yeast fermentation that subsequently takes place in the loaf of dough. Hence the dough will "rise" more quickly, uniformly, and effectively than when it is molded in the usual manner.

In the accompanying drawings I have illustrated a simple mechanism for carrying into effect the objects stated and will describe hereinafter the arrangement and combination of parts shown, but do not thereby wish to be understood as limiting myself to the peculiar means shown.

In the accompanying drawings, Figure 1 is a top plan view of my machine with the pressure-plate removed. Fig. 2 is a cross-section through the molding-rolls and a lump of dough that has been manipulated by the machine. Fig. 3 is a rear elevation of the machine. Fig. 4 is a cross-section through the machine and a lump of dough, the latter being shown at the beginning of the molding operation. Fig. 5 is an end elevation of my machine, showing a modified form of pressure-plate. Fig. 6 is a fragmentary detail of the clutch and gearing devices; and Fig. 7 shows a series of cam-face wheels, which are used in my machine as a part of the gearing mechanism.

Referring to the drawings in detail, it will be seen that the supporting-frame of the machine consists of two pairs of legs 1 1, each pair formed integrally with a lower cross-bar $1^a$ and upper cross-bar $1^b$ and the two parts so formed being connected by the rods or braces $1^c$ $1^d$, the whole constituting a strong and rigid rectangular frame. Suitably journaled on the frame is a shaft 2, on one end of which is mounted a worm-pinion $2^b$. There are also mounted on the shaft 2 at spaced intervals two series of wheels $2^c$ $2^e$, in one side of each of which is a cam-groove $2^d$, which varies in the several wheels of each series, so that the pins working in such grooves, as hereinafter described, will be given strokes of different lengths and will be operated at different times.

On one end of a stud-shaft 3, which is journaled in the frame, is a drive-pulley $3^a$ and on its opposite end is a worm $3^b$ and adjacent to the worm a pinion $3^c$. The worm $3^b$ meshes with and drives the worm-gear $2^b$ on the shaft 2.

Suitably journaled in the upper part of the frame members are eight shafts, four of which, as $4^a$, are adapted to rotate in one direction and the other four, as $5^a$, in the opposite direction. On the shafts $4^a$ are fixed a series of rollers 4 and on the shaft $5^a$ are corresponding rollers 5, and the faces of each series of rollers are in contact; but a slight space is left between the innermost rollers of both series, as shown in Fig. 4. Filling the space between the innermost rollers is a scraper 6, which is so set that any dough adhering to said rollers will be removed by the scraper. As the other rollers in each series are in contact they will clear themselves of adhering dough under ordinary conditions; but, if desired, a scraper, like 6, can be set between each pair of rollers. On the end of each shaft is a pinion $4^b$ $5^b$, which mesh with and are driven by pinions $4^c$ $5^c$, which are loosely mounted on stud-shafts $4^d$ $5^d$, which extend from the frame at points below the shafts $4^a$ $5^a$, and the first of said pinions at the right hand of the machine, as shown in Fig. 3, is driven by the pinion $3^c$. It will be seen that the pinions $4^c$ $5^c$ on the shafts $4^d$ $5^d$ of the innermost rollers of each series intermesh, so that the motion given the pinion $3^c$ is communicated throughout the train of gears represented by $4^b$ $4^c$ and $5^b$ $5^c$. As these gears are loosely mounted on their respective shafts they will be in constant motion without affecting the rollers which are fixed on the shafts $4^a$ $5^a$.

To drive the rollers, I have provided on each of their shafts $4^a$ $5^a$ a common form of clutch consisting of two half-clutches $7^a$ $7^b$, respectively, the former secured to the adjacent pinion $4^b$ or $5^b$ and the latter splined on the shaft $4^a$ or $5^a$ on which it is mounted. The member $7^b$ is formed with an annular groove which is embraced on opposite sides by suitable inwardly-extending pins in the fork or arms $8^b$ of the levers 8. These levers are pivoted near their center on horizontal brackets $8^a$, extending from the frame, and in their lower end is a pin which works loosely in the cam-groove $2^d$ in the wheels $2^e$ and is moved toward and away from the center of the wheels by the cams $2^f$, thus throwing in and out the ends of said lever. The cams $2^f$ are formed with their operative surfaces of different lengths and are so set on their respective shafts that they will act on the levers successively, and as the four cams of one series of wheels correspond with the cams of the other series the corresponding levers will move in unison and as the respective clutches are brought together the roller-shafts will be started.

The train of gears, cams, and their coöperating clutches above described are so arranged that the end rollers of each series will be started and given several revolutions before the next rollers in each series are started, and the same sequential movement takes place in the succeeding rollers, so that the center rollers are the last to receive impetus from the driving wheel or pulley $3^a$. As a result of this action of the rollers a mass of dough, as 10, placed thereon and held in frictional contact therewith will be rolled up from the outer ends, as indicated in Figs. 2 and 4.

To hold the dough in proper frictional contact with the rollers, I provide a plate 16, which is hung at the outer ends of arms 12, which are provided with counterweights $12^b$ and are pivoted at $12^a$ between the upper ends of levers 13. The levers 13 are pivotally mounted on a shaft 14, which is journaled in brackets $14^a$, extending from the frame, and embrace cam-wheels 15, which are mounted on the ends of the shafts of the second roller of each series. From the members of the levers extend pins $13^a$, which fit loosely the peripheral cam-grooves $15^a$ of the cam-wheels, thus upon the rotation of the latter causing the levers to move outwardly and inwardly and producing a corresponding movement of the plate 16. If such movement is not desired, the pins $13^a$ are removed.

If it be desired to move the dough at right angles to the rollers, I substitute the plate $16^b$ (shown in Fig. 5) for the plate 16. The plate $16^b$ has downwardly-extending sides, as $16^a$, which embrace the lump, and as the plate moves back and forth across the rollers through the action of cams 15 described a corresponding movement is given the dough, with the result that it takes on a spherical form instead of the cylindrical form which it will assume when subjected to the action of the rollers alone.

Through the counterweight $12^b$ I am enabled to place more or less pressure on the lump of dough, as may be desired, and by pivoting the pressure-plate 16, (or $16^b$,) as at $12^a$, it can be readily thrown back to be out of service or when it is desired to remove the loaf of dough. By pivoting the pressure-plate 16 on the supporting-arm 12, as shown in Fig. 5, the operator can by hand-pressure on the plate regulate the frictional contact between any portion of the dough and rollers, thus controlling the shaping of the mass, as may be desired.

Having thus described my invention, what I claim as new, and desire to obtain by Letters Patent, is—

1. In a dough-forming machine, two sets of rollers adapted to support a lump of dough, means for holding the dough in position on said rollers, and means for operating said rollers, said means adapted to start said rollers in sequence beginning with the rollers at the outer end of each set.

2. In a dough-forming machine, two sets of rollers adapted to jointly support a lump of dough, adjustable means for holding the dough in position on said rollers, said means adapted to move at right angles to the plane of rotation of said rollers, and means for operating said rollers.

3. In a dough-forming machine, two sets of rollers adapted to jointly support a lump of dough, adjustable means for holding the dough in position on said rollers, and means for rotating said rollers in sequence beginning with the rollers at the outer end of each set.

4. In a dough-forming machine, two sets of rollers, the rollers of each set being in contact with each other and driven in the same direction and the inside rollers of both sets being spaced apart, a scraper between said inside rollers, and adjustable means for holding the dough in position on the rollers.

5. In a dough-forming machine, two sets of rollers mounted to rotate in opposite directions substantially as set forth, means for rotating the rollers of each set in succession, with the corresponding rollers of both sets moving in unison, and reciprocating means for holding a lump of dough in position on said rollers.

In testimony whereof I affix my signature in presence of two witnesses.

CHRISTIAN F. DIETZ.

Witnesses:
F. BENJAMIN,
WM. B. MOORE.